United States Patent [19]

Beatty

[11] Patent Number: 4,683,867
[45] Date of Patent: Aug. 4, 1987

[54] BARBECUE GRILL

[76] Inventor: Theodore J. Beatty, 53831 Whittaker Forest Rd., Badger, Calif. 93703

[21] Appl. No.: 794,577

[22] Filed: Nov. 4, 1985

[51] Int. Cl.$^4$ ............................................. A47J 37/00
[52] U.S. Cl. .................................. 126/41 R; 99/444; 126/214 D
[58] Field of Search ............... 126/41 R, 21 A, 214 D, 126/383; 99/444, 446

[56] References Cited

U.S. PATENT DOCUMENTS

| | | | |
|---|---|---|---|
| 1,339,215 | 5/1920 | Morris | 126/214 D |
| 1,373,788 | 4/1921 | Ball | 126/41 R |
| 2,720,827 | 10/1955 | Del Francia | 99/446 |
| 2,867,165 | 1/1959 | Money | 99/446 |
| 2,985,097 | 5/1961 | Nevin et al. | 99/447 |
| 3,049,071 | 8/1962 | Diack | 99/446 |
| 3,385,282 | 5/1968 | Lloyd | 126/26 |
| 3,396,716 | 8/1968 | Weyland et al. | 126/41 R |
| 3,568,590 | 3/1971 | Grice | 99/446 |
| 3,638,634 | 2/1972 | Bolitho | 126/41 R |
| 3,693,534 | 8/1972 | Martin | 99/446 |
| 3,805,688 | 4/1974 | Gvozdjak | 99/446 |
| 3,959,620 | 5/1976 | Stepler, Jr. | 126/41 R |
| 3,967,613 | 7/1976 | Rybak et al. | 126/41 R |
| 3,989,028 | 11/1976 | Berger | 126/41 R |
| 4,043,312 | 8/1977 | Kern . | |
| 4,188,937 | 2/1980 | Baynes | 126/41 R |
| 4,213,381 | 7/1980 | Ellis | 99/446 |
| 4,276,869 | 7/1981 | Kern . | |
| 4,290,408 | 9/1981 | Juett et al. . | |
| 4,403,597 | 9/1983 | Miller . | |

FOREIGN PATENT DOCUMENTS 290951  1/1960  Australia ........................... 126/41 R Primary Examiner—Samuel Scott
Assistant Examiner—H. A. Odar
Attorney, Agent, or Firm—Knobbe, Martens, Olson & Bear

[57] ABSTRACT

A gas-fired barbecue grill is provided with a pair of generally rectangular metal plates disposed in the grill above the burner unit and below the cooking grate at an inclined position to prevent the pooling of food drippings and grease which tends to result in grease fires.

11 Claims, 9 Drawing Figures

U.S. Patent  Aug. 4, 1987  Sheet 1 of 4  4,683,867
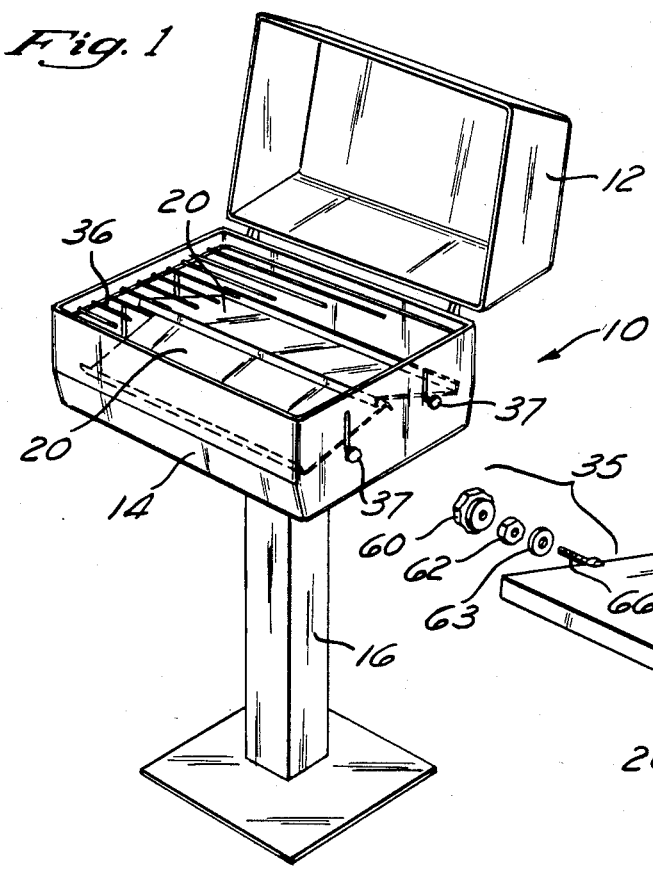
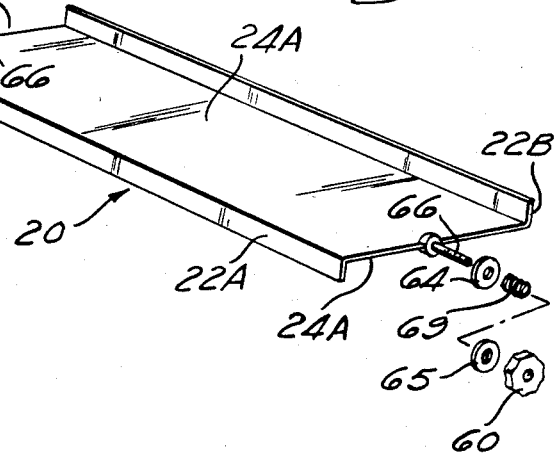

BARBECUE GRILL

BACKGROUND OF THE INVENTION

When meat is cooked in a barbecue grill over charcoal briquets, the juices of the meat drip onto the hot briquets and are vaporized. As a result of this process, a desirable smoked flavor is imparted to the meat.

Gas barbecue grills duplicate this flavoring effect. A commonly used type of gas barbecue uses lava rocks or other porous objects between the burner and the meat to serve the same purpose as the charcoal briquets. However, as with charcoal briquets, grease from the meat accumulates on the porous rocks and ignites when it reaches its flash temperature. The resulting flame burns the meat and interferes with the preferred slower cooking process.

Prior patents show attempts to develop a gas barbecue which uses a metal plate instead of lava rocks to radiate the heat from the burner. In these grills, a metal plate is placed within the barbecue grill above the burners and below the grate which supports the meat. A single horizontal metal plate extends over the entire burner. The plate usually has a contoured upper surface which may be generally similar in appearance to charcoal briquets. During the cooking process, juices of the meat drip down onto the hot plate, are vaporized, and impart the desired smoked flavor to the meat. Although the plate imparts the desired smoked flavor, it does not solve the flaming problem. Grease tends to pool on the plate and ignite when it reaches its flash temperature. When the grease is ignited, the resulting flames burn the meat.

SUMMARY OF THE INVENTION

This invention provides a pair of generally flat, rectangular metal plates disposed between the burner unit and the food-supporting cooking grate in a barbecue grill. These plates are heated by the burner unit and radiate that heat to the food on the grate. The plate surfaces are not horizontal, but rather are oppositely and outwardly inclined.

When food is barbecued, food drippings contact the hot plates and are vaporized. Because the surfaces of the plates are smooth and inclined, food drippings and grease do not pool on them. Any drippings or grease which does not promptly vaporize runs down the plates and away from the gas flame where the grease would ignite.

The plates can be rotatably attached to the barbecue housing, or they can be placed upon a grate intermediate the cooking grate and the burner unit.

The plates also provide a means for altering the quantity and direction of the hot air flow to the food in the barbecue, thus causing food at different locations within the grill to cook at different rates.

In addition, the invention provides for automatic cleaning of the plates of the barbecue grill at the same time the grill is being preheated or used for cooking.

BRIEF DESCRIPTION OF THE DRAWINGS

FIG. 1 is a perspective view of one embodiment of the present invention.

FIG. 2 is a perspective view of a Z-shaped plate that is used in the present invention, shown removed from the barbecue housing and with portions exploded.

FIG. 3 is a perspective view of the barbecue housing and its contents.

DETAILED DESCRIPTION OF THE PREFERRED EMBODIMENTS

Figure 4:
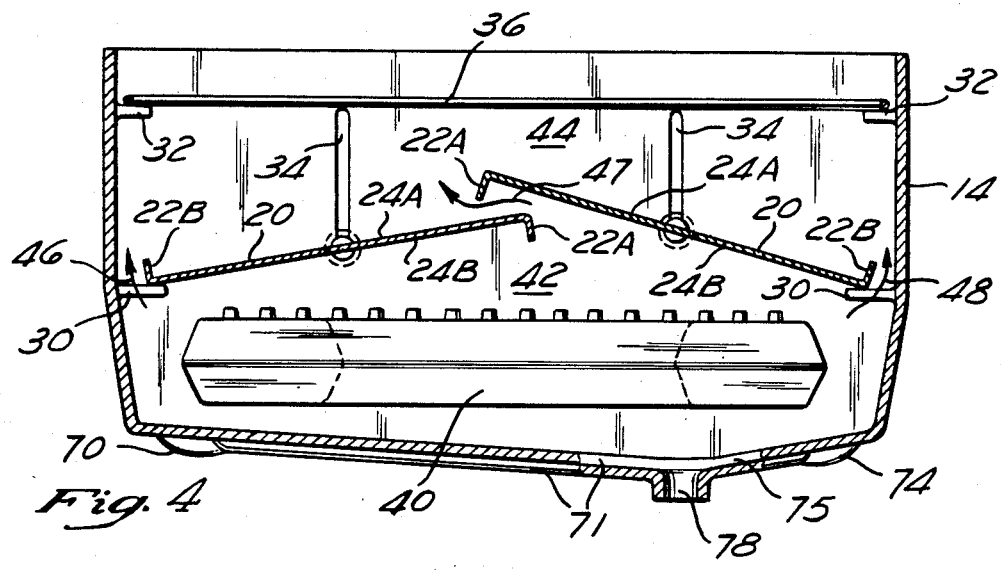
FIG. 4 is a sectional view through the barbecue housing taken along lines 4—4 in FIG. 3.

FIG. 1 illustrates a gas barbecue 10 in accordance with one embodiment of the present invention. The gas barbecue 10 is supported by a base 16 and may have a hinged cover 12. The housing 14 of the gas barbecue 10 encloses a pair of generally Z-shaped plates 20 which are located beneath a food-supporting cooking grate 36. The Z-shaped plates 20 are attached to the barbecue housing 14 by positioning knobs 60.

FIG. 2 shows one of the plates 20 in more detail. The plate 20 shown in FIG. 2 is generally Z-shaped and preferably made of steel of about 14 gauge. It has been determined, however, that plates of up to ¼" thick provide satisfactory results. Aluminum plates are less desirable since they exhibit much less temperature uniformity. The plate 20 has two generally flat surfaces 24A and 24B and two flanges 22A and 22B. These flanges 22A and 22B run the length of the plate 20 and extend generally perpendicularly from the plate 20 in opposite directions.

Figure 5:
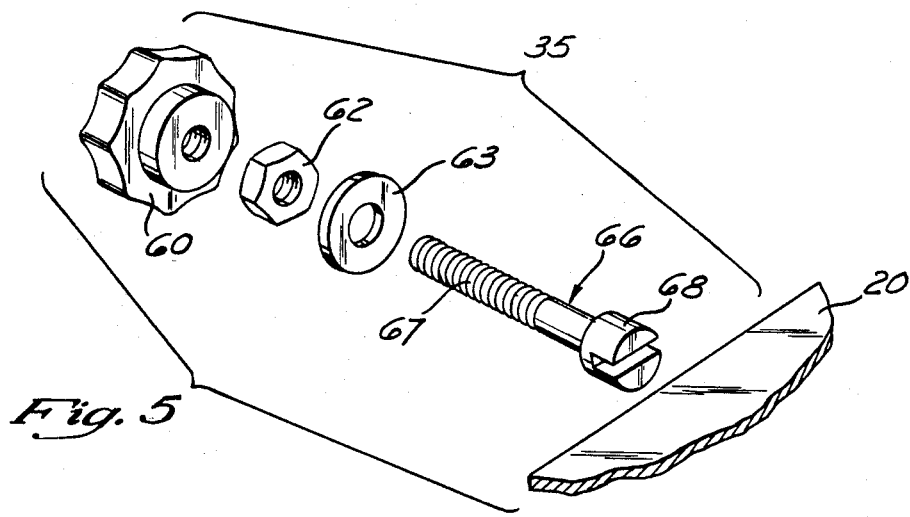
FIG. 5 is an exploded perspective view of a rotation assembly of one embodiment of the invention.
Figure 6:
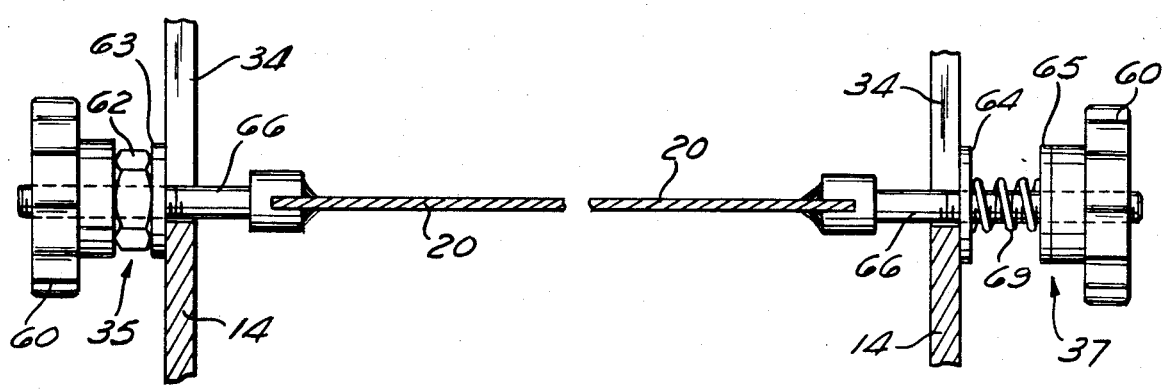
FIG. 6 is a partial sectional view through the barbecue housing taken along lines 6—6 in FIG. 3.

As shown in FIGS. 2, 5, and 6, a mounting bolt 66 is attached at each end of the plate 20. The mounting bolt 66 shown in FIG. 5 and on the left-hand side of FIGS. 2 and 6 receives a washer 63, a locking nut 62, and a positioning knob 60 to form a plate rotation assembly 35. The mounting bolt 66 is comprised of a threaded portion 67 and a slotted portion 68. The slotted portion 68 receives the edge of the plate 20 and is welded to the plate 20 to form a permanent attachment. The washer 63 is not threaded while both the knob 60 and the locking nut 62 are threaded. When the positioning knob 60 and the locking nut 62 are threadably attached to the threaded portion 67 of the mounting bolt 66, the nut 62 can be sufficiently tightened against the knob 60 so that neither the knob 60 nor the nut 62 rotates with respect to the bolt 66 when moderate rotational force is applied to the knob 60. Thus, the positioning knob 60 does not rotate with respect to the plate 20 and can be used to rotate and position the plate 20.

The mounting bolt 66 shown in the right-hand side of FIGS. 2 and 6 receives an inner washer 64, a spring 69, an outer washer 65, and a positioning knob 60 to form a tensioning assembly 37. The mounting bolt 66 is attached to the plate 20 in the same manner described above. In this tensioning assembly 37, the washers 64 and 65 are unthreaded while the knob 60 is threaded. When the knob 60 is sufficiently tightened by rotation, the resulting compression of the washer 64 against the barbecue housing 14 will prevent the plate 20 from rotation with respect to the barbecue housing 14 under normal forces. The tensioning assembly 37 just described would function properly without the spring 69 if the plates 20 and the barbecue housing 14 had the same coefficient of thermal expansion. However, the spring 69 is included in the tensioning assembly 37 to compensate for any reduction in tension otherwise caused by the plates 20 expanding at a higher rate than the barbecue housing 14.

FIGS. 3 and 4 illustrate the orientation of the plates 20 within the barbecue housing 14. The plates 20 are disposed below the cooking grate 36, which is supported by a number of upper tabs 32 located about the inner perimeter of the barbecue housing 14 and above the burner 40. The upper tabs 32 extend inwardly from the inner side of the barbecue housing 14. The plates 20 are inclined upwardly toward the central axis of the housing 14 so that each is inclined downwardly from the central area of the cooking grate 36 toward a respective side of the housing.

As shown in FIG. 3, the mounting bolts 66 attached to the plates 20 extend through the barbecue housing 14 through four elongated apertures or slots 34. The attachment of the plates 20 to the housing 14 via the mounting bolts 66 is completed by the two rotation assemblies 35 and the two tensioning assemblies 37 discussed in connection with FIG. 6.

Referring again to FIG. 4, the outer flanges 22B of the plates 20 may rest on the lower tabs 30 which extend inwardly from the inner surface of the barbecue housing 14. The plates may also be positioned so that the flanges 22B are spaced above the lower tabs 30. The tensioning assemblies 37 provide enough tension to support the plates 20 at any altitude defined by the slots 34 or at any rotational position.

Figure 7:
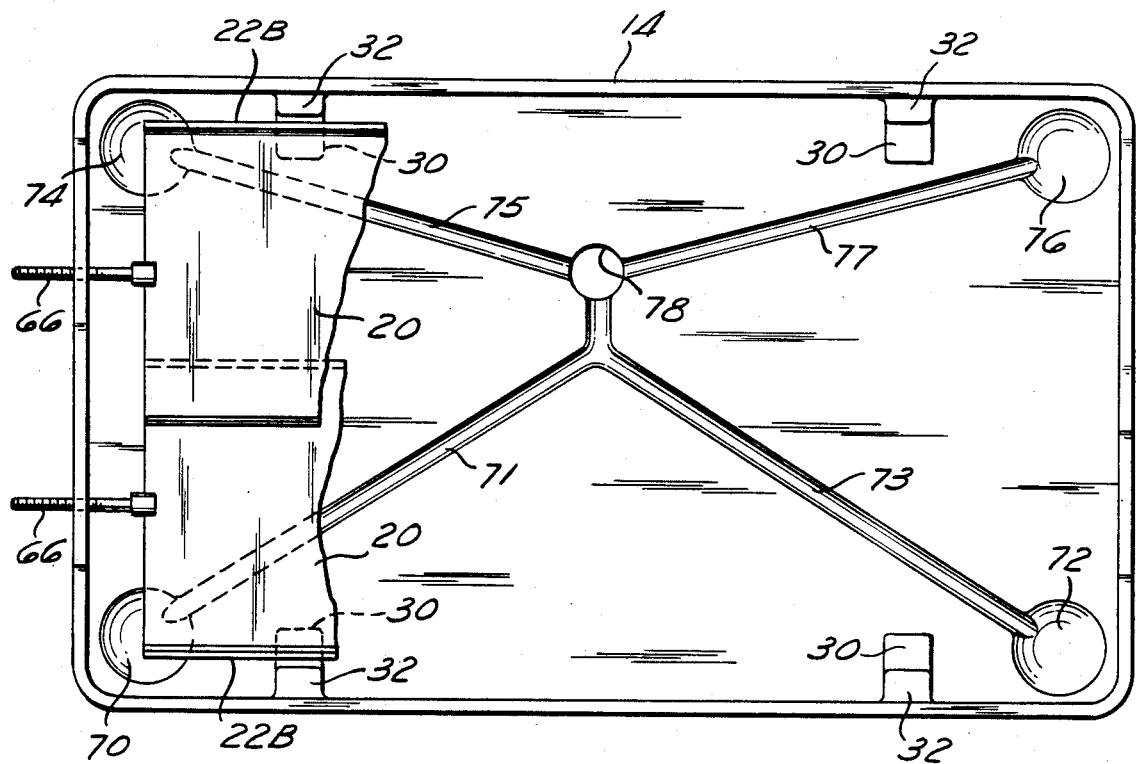
FIG. 7 is a top view of the barbecue housing of one embodiment of the present invention with portions removed for clarity.
Figure 4:
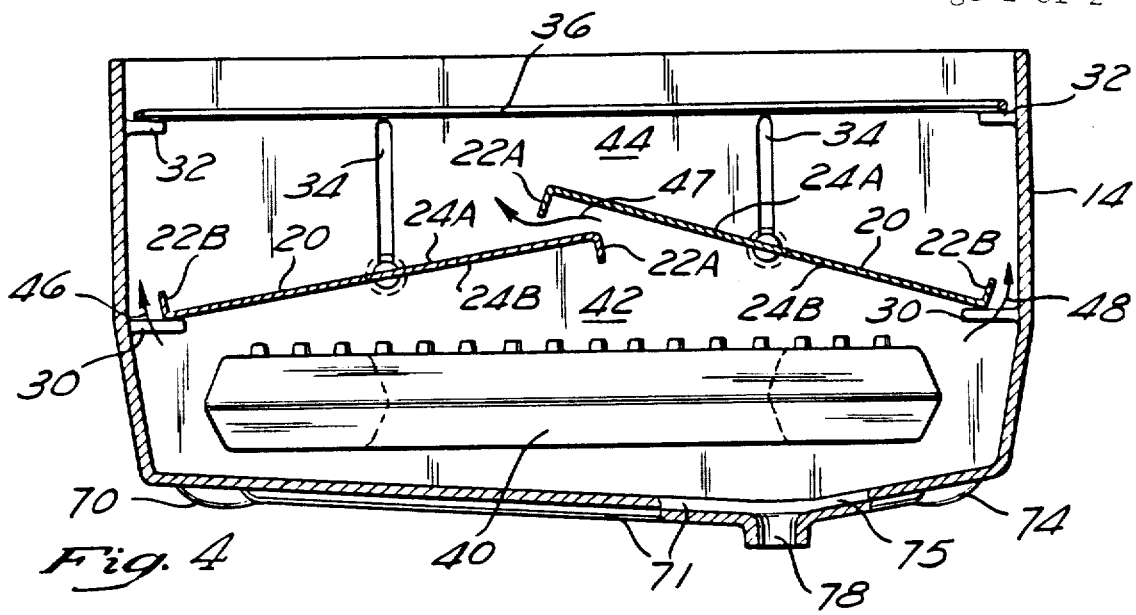
Figure 8:
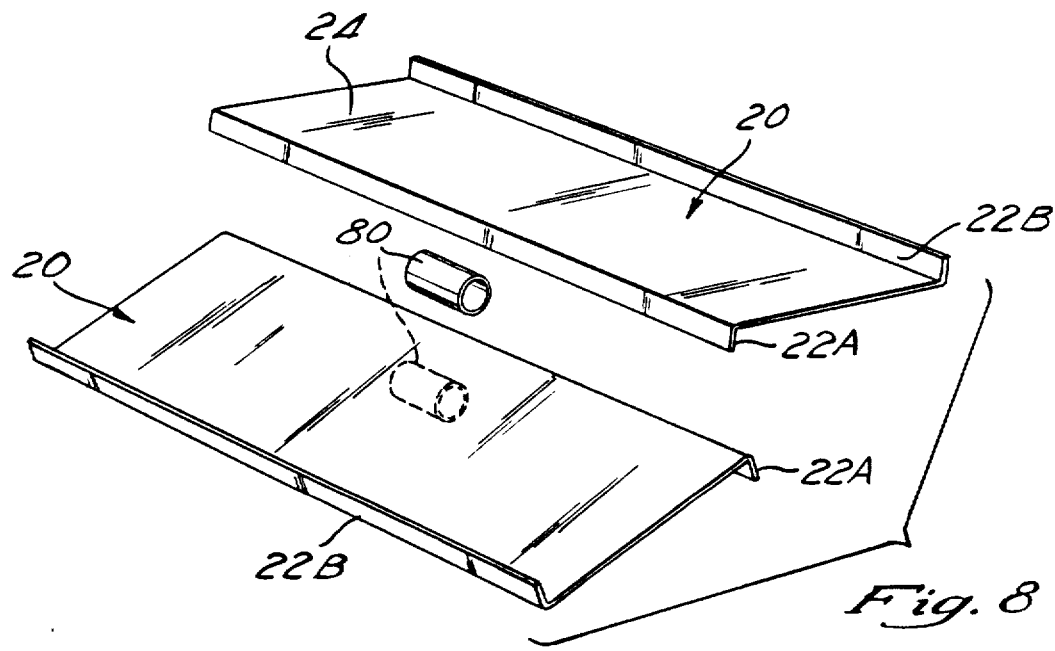
Figure 9:
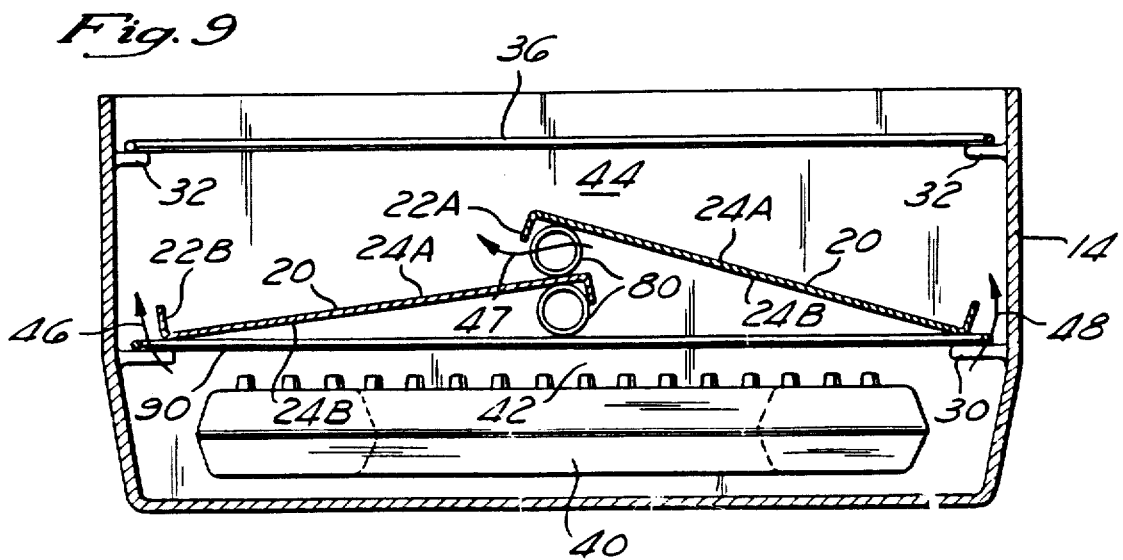

FIG. 7 illustrates a grease evacuation system formed in the bottom of the barbecue housing 14. Located at each of the four corners of the bottom of the barbecue housing 14 are four circular depressions 70, 72, 74, and 76 formed in the bottom of the housing 14. These circular depressions, 70, 72, 74 and 76 are generally convex when viewed from above so as to be deepest at their centers. Circular depression 70 is located at the left front portion of the barbecue housing 14, circular depression 72 is located at the right front portion, depression 74 is located at the left rear portion of housing 14 and depression 76 is located at the right rear portion. These circular depressions 70, 72, 74, and 76 are connected to a grease drain hole 78 by four drain channels 71, 73, 75 and 77, respectively, formed in the bottom of the housing 14. Each of the drain channels 71, 73, 75, and 77 slopes downward toward the drain hole 78. Each of the depressions 70, 72, 74, and 76 lies directly beneath a respective one of the outside corners of the plates 20 formed at each end of the flanges 22B.

The operation of the first embodiment of the invention just described can be explained with reference to FIG. 4. The plates 20 shown in FIG. 4 are located in oppositely inclined positions within the barbecue housing 14 above the burner 40 and below the tabs 32 used to support the cooking grate 36.

When the barbecue grill of the present invention is used, it is typically preheated with the gas burner 40 set at high and the hinged cover 12 closed. During this preheat period the flames emitted from the burner 40 heat the plates 20 and the air in the combustion chamber 42. When the preheat period is finished, the cooking chamber 44 has been heated from the hot air flows 46, 47, and 48 and from heat radiated from the plates 20. The meat to be barbecued is placed on the grate 36 and the burner is preferably turned to a lower setting. The grease drippings from the meat contact the hot plates 20 and are vaporized, imparting the smoked flavor to the meat. If generated in sufficient quantities, the grease drippings may reach the lower flanges 22B of the plates 20. In this case, the drippings run off the four exterior corners of the plates 20 and into the circular depressions 70, 72 74, and 76. From these depressions, the grease is channeled by the drain channels 71, 73, 75, and 77 to the drain hole 78 where it exits the barbecue to be collected in a grease cup or can.

An important function of the barbecue 10 is to route all grease drippings through the barbecue on a path such that no grease contacts the flame from the burner 40. The plates 20 completely shield the burner 40 from any grease drippings by overlapping in the middle of the barbecue housing 14 and extending beyond the burner 40. Thus, there is no direct vertical path from the food being cooked to the burner 40 which would allow grease to contact the burner. While shielding the burner 40 from grease, the oppositely inclined plates 20 and the flanges 22B route the grease above the burner 40 to the four corners of the barbecue, which are beyond the burner 40. The grease drips from the corners of the plates 20 to the circular depressions 70, 72, 74, and 76 where the grease lies below the burner 40. The grease is then directed to the drain hole 78 via drain channels 71, 73, 75, and 77. In this process, the grease does not make contact with the flame from the burner 40.

Although no straight line path between the food and the burner 40 exists, grease might contact the flame from the burner 40 by splattering through the opening between the plates 20 at the middle of the barbecue or at the two openings defined by the ends of the plates 20 and the barbecue housing 14 at the edge of the barbecue. Flanges 22A and 22B of the plates 20 minimize these splattering effects.

In normal operation, the plates 20 should be in an inclined position with respect to the horizontal. This inclined position prevents the pooling of grease and meat drippings, thus minimizing the flaming problems inherent in lava rock barbecues. Meat drippings which come in contact with the plates 20 are effectively spread out as they run down the plates to the lower flanges 22B. The drippings are vaporized as they run down the plates 20. Thus, a significant portion of the grease will not reach the flanges 22B.

Experiments with a commercially available barbecue have shown the ideal angle of inclination of the plates 20 to be approximately 18° to 22°. At these angles, even if the plates 20 are heated enough so that grease reaches its flash temperature upon contact with them, the resulting flames quickly disappear since the grease is rapidly spread out by the inclined plates and vaporized.

At significantly shallower angles the grease does not run off the plates 20 quickly enough resulting in the flaming problem inherent in lava rock barbecues. At angles much steeper than the preferred 18° to 22°, the grease runs off the plates too quickly, resulting in an undesirable increase in the splattering effects mentioned above. Also, since the grease is in contact with more steeply inclined plates for a shorter period of time, less grease is vaporized, resulting in a weaker flavoring effect and an increase in the amount of grease exiting the barbecue at the drain hole 78. As a practical matter, greatly increased angles of inclination are precluded by the relatively small depth between the burner and the cooking grate 36.

With these objectives in mind, and within the constraints of the space available between the burner and the cooking grate, the proper positioning of the plates for any given barbecue can easily be determined empirically.

Another object of the invention can be seen from FIG. 4. A combustion chamber 42 is defined by the four walls of the barbecue housing 14, the lower surfaces 24B of the plates 20, and the bottom of the barbecue housing 14. The burner 40 is located within this combustion chamber 42. A cooking chamber 44 is defined by the same four walls of the barbecue housing 14, the upper surfaces 24A of the plates 20, and by the hinged cover 12 (not shown here) when closed. The cooking grate 36 lies within this cooking chamber 44. There are three paths of hot air flow from the combustion chamber 42 to the cooking chamber 44 within the barbecue housing 14. Two of these hot air flow paths are located between the flanges 22B and the housing 14, generally at the vicinity of the lower tabs 30, and are indicated by the arrows 46 and 48. In practice it has been found that good air flow results when this space between the plates 20 and the housing 14 is up to one inch wide. The lower tabs 30 are quite narrow as shown better in FIG. 3 and do not run the length of the housing 14. A third path of hot air flow is located in the middle of the barbecue between the plates in the vicinity of flanges 22A and is represented by arrow 47. This hot air adds convection heating to the radiant heat from the plates. As can be seen from the relative position of the two plates 20, the path of the hot air flow represented by arrow 47 is directed toward the front of the housing 14, or to the left of FIG. 4. This hot air flow will cause the front portion of the gas barbecue to be appreciably hotter than the rear portion. Thus, meat to be cooked rare would be placed at the rear portion of the cooking grate 36 while meat to be cooked medium would be put at the front portion. It should also be noted that the direction of hot air flow represented by arrow 47 may be redirected toward the rear portion of the barbecue by relocating the plates 20.

The position of each plate 20 can be altered by first loosening the positioning knob 60 of the tensioning assembly 37, positioning the plate 20 in the desired manner by rotating the positioning knob 60 of the rotation assembly 35, and retightening the knob 60 of the tensioning assembly 37. In this manner, each plate can be raised, lowered, and set at different angles of inclination within the housing 14.

Even though most of the grease runs down and off the plates, when the barbecue has been used for a significant period of time, the surfaces 24A of the plates 20 (shown in FIG. 4) may become caked with dried grease. This dried grease may be burned off and the plates may be cleaned by turning both plates 20 over so that surfaces 24A face the burner 40. The surfaces 24A then will be cleaned by the burner 40 during the next preheat or cooking period. Because the plates 20 are symmetrical about their axes of rotation as defined by the mounting bolts 66, each side of each plate 20 may be used for cooking. Thus, no extra cleaning time, or heat, is required.

The plates 20 may be inverted for cleaning in the following manner. First, the cooking grate 36 should be removed from the barbecue. The plate 20 shown in the right-hand portion of FIG. 4 should be loosened, moved upward within the slot 34, positioned vertically, and then tightened so that it will remain in that position. The left-hand plate 20 may then be loosened, moved upward within the slot 34, flipped over, then lowered within the slot 34 and then retightened in an inclined position. The right-hand plate may then be loosened and moved downward within the slot 34 and retightened in an inclined position above the left-hand plate. This movement in the slots 34 is necessary to avoid interference with the burner 40.

Figure 8:
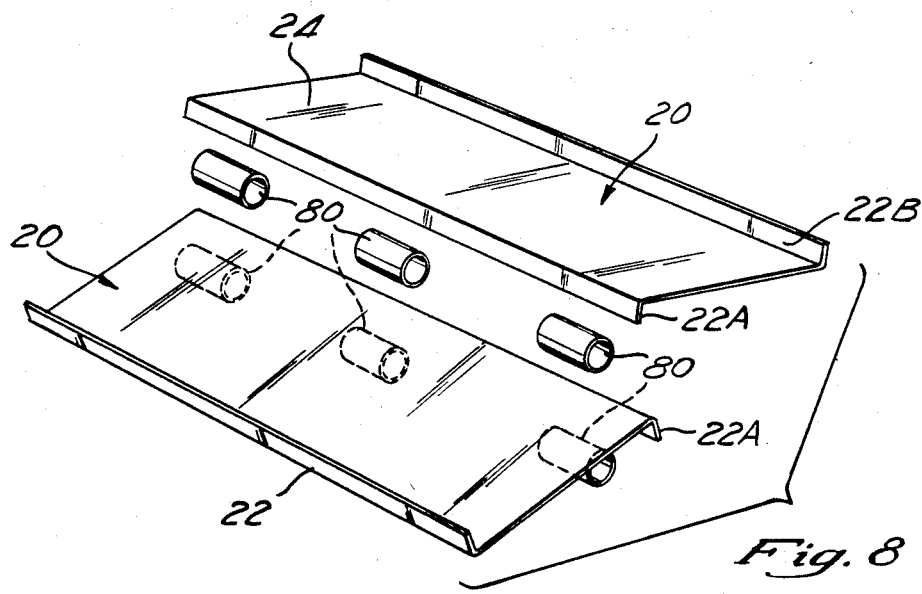
FIG. 8 is a perspective view of two Z-shaped plates as used in another embodiment of the present invention.
Figure 9:
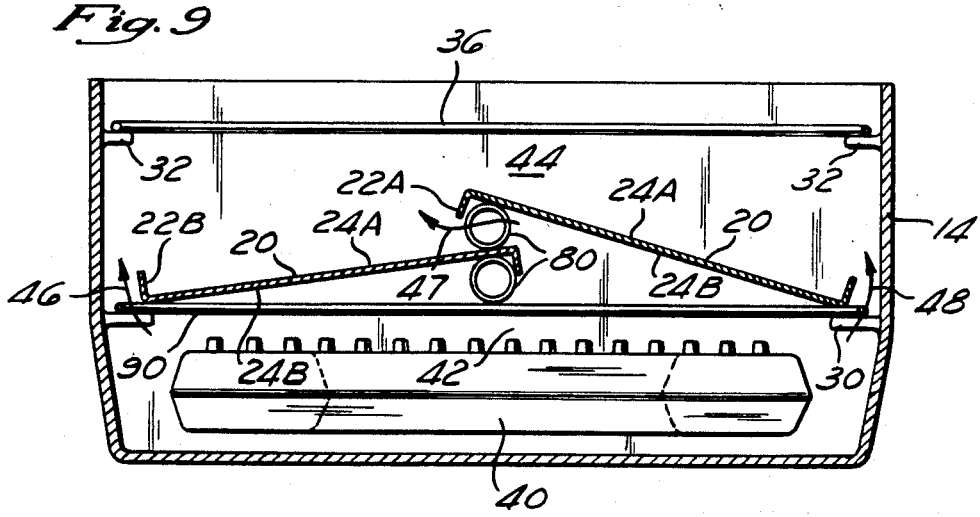
FIG. 9 is a sectional view through the barbecue housing incorporating the plates shown in FIG. 8.

A second embodiment of the present invention is illustrated in FIGS. 8 and 9. This embodiment is designed to fit existing gas barbecue grills. The plates 20 shown in FIG. 8 are identical with the plates of the first embodiment described above except that they have no rotation assemblies or tensioning assemblies. The rotation assemblies 35 and tensioning assemblies 37 used in the first embodiment for positioning and holding the plates 20 in place are effectively replaced by a number of spacing cylinders 80. These spacing cylinders 80 are short, hollow, and cylindrically-shaped.

As shown by FIG. 9, the two Z-shaped plates 20 are supported above the burner 40 on a grate 90 typically used to hold lava rocks. The grate 90 is generally composed of metal rods and is generally similar to the cooking grate 36. The spacing cylinders 80, which are held in place by flanges 22A, support the plates 20 in an inclined position. It should be evident that spacing cylinders of various sizes might be used to vary the angle of inclinations of the plates 20.

The operation of this second embodiment of the invention is substantially identical to the operation of the first embodiment described above. The plates 20 impart the desired smoked flavor to the food being cooked while the grease is channeled off and vaporized in the process. The same air flows exist within a barbecue grill containing this embodiment of the invention. These plates 20, which are also symmetrical, may be inverted and cleaned during the preheat stage of the barbecue.

Although the plates 20 of the present invention are illustrated as being substantially flat, any plates which do not present barriers to grease flow down their surfaces may be used. Also, instead of a pair of plates, a single plate could be used with the present invention. While a single plate would not offer the variable centralized air flow 47, the grease-vaporizing and flavor-imparting advantages of the invention would still be obtained.

Further modifications and alternative embodiments of the invention will be apparent to those skilled in the art in view of the foregoing description. Accordingly, this description is to be construed as illustrative only, and is for the purposes of teaching those skilled in the art a manner of carrying out the invention. The details of the structure may be varied substantially without departing from the spirit of the invention and the exclusive use of such modifications as comes within the scope of the appended claims is contemplated.

What is claimed is:
1. A barbecue grill comprising:
a burner unit having a width and a length;
a grate;
two plates, each having a length, a width, and two opposing substantially flat surfaces;
a housing having sides enclosing said burner unit, said grate, and said plates;
two pairs of slots through opposite sides of said housing, each pair having a first slot in one side of said housing and an aligned second slot in the opposite side of said housing;

a tensioning assembly attached to one end of each of said plates for supporting said plates in said housing above said burner unit and below said grate, each said tensioning assembly comprising:
  a first mounting bolt fixedly attached to one end of said plate and having a threaded portion extending out through one of said slots;
  a spring on said threaded portion outside said housing;
  a threaded knob on the end of the threaded portion of said bolt, said tensioning assembly capable of exerting sufficient force on each of said plates when said knob is tightened to prevent said plates from rotating within said housing; and
a rotation assembly attached to the end of each of said plates opposite said mounting bolt for supporting said plates in said housing above said burner unit and below said grate, each said rotation assembly comprising:
  a second mounting bolt fixedly attached to said plate having an end extending out through the second slot of a pair of slots;
  a knob fixedly attached to said end of said second mounting bolt;
the length of each of said plates being longer than the length of said burner unit but shorter than the length of said housing and the width of each of said plates being shorter than the width of said burner unit, the sum of the widths of said two plates being greater than the width of said burner unit;
each of said plates having an axis of rotation running along the length of each of said plates between said first and said second mounting bolts;
each of said plates being symmetrical about said axis of rotation such that the shape of said plate does not appear to have changed when said plate is rotated 180° about said axis of rotation;
each of said plates having a pair of protruding flanges, said flanges protruding from opposite edges of said plates;
said housing including four convex depressions, four drain channels, and an aperture, all of which are formed in the bottom of said housing;
each of said depressions being located at a corner of the bottom of said housing beneath a respective corner of said plates;
each of said drain channels connecting one of said depressions to said drain hole, said drain channels sloping downward in said housing towards said drain hole.

2. A method of barbecuing and of cleaning a plate disposed in a barbecue grill above a burner unit and below a food-supporting grate, said plate being symmetrical about an axis of rotation, said method comprising the steps of:
  (a) operating said burner to heat said plate to a temperature sufficient to cook food in the grill;
  (b) cooking food on said grate;
  (c) permitting drippings from said food to drop on a first side of said plate and vaporize when striking said hot plate, said first side facing toward the food-supporting grate and away from the burner unit;
  (d) turning said burner off when said food is cooked;
  (e) repeating steps (a) through (d) until a substantial amount of dried grease and other deposits have accumulated on said first side;
  (f) inverting said plate so that said first side faces the burner unit and the opposite side of said plate faces the food-supporting grate; and
  (g turning on the burner unit of the barbecue so that the accumulated grease and other deposits are burned off said first side of said plate at the same time the barbecue grill is being preheated in preparation for a subsequent cooking.

3. A barbecue grill, comprising:
a housing having a top, a bottom, sides, and a center located between said sides;
a burner unit in said housing;
a grate supported above said burner unit;
substantially planar independently rotatable first and second plates in said housing between said burner unit and said grate, said first and second plates each having a first edge, and a second edge opposite said first edge;
said first and second plates each having an upturned flange along said first edge and a downturned flange along said second edge;
means for supporting said first and second plates in said housing inclined at an angle with respect to the horizontal so that said first edges of said plates are below said second edges of said plates, said first flanges of said plates are adjacent to the sides of said housing and said second flanges are in the center of said housing, and said second flange of said second plate is positioned vertically above said first plate;
said first plate and said second plate providing a barrier between said burner unit and said grate so that no direct vertical path exists between said burner unit and said grate;
said plates each including a liquid flow path over substantially its entire upper surface, said flow path directing substantially all liquid which falls on the plate down said plate toward the sides of said housing to points that are not directly above said burner unit.

4. A barbecue grill having a top and a bottom, comprising:
a burner unit having a length and a width;
a grate above said burner unit;
a first plate and a second plate, each said plate having a length and a width and having two opposing substantially flat surfaces;
a housing having sides enclosing said burner unit, said grate, and said plates; and
means for supporting said plates in said housing above said burner unit and below said grate;
the length of each of said plates being longer than the length of said burner unit and the width of each of said plates being shorter than the width of said burner unit, with the sum of said plate widths being greater than the width of said burner unit;
each of said plates having an axis of rotation running along the length of each of said plates and each of said plates being independently rotatable about said axis in said housing;
each of said plates being substantially symmetrical about said axis of rotation such that the shape of said plate does not appear to have changed when said plate is rotated 180° about said axis of rotation.

5. A barbecue grill as claimed in claim 4 wherein said housing has two elongated slots in each of two opposite sides of said housing, further comprising:

means mounting each of said plates for rotational and translational movement within two of said slots on opposite ends.

6. A barbecue grill as claimed in claim 5 wherein said housing includes four convex depressions, four drain channels, and an aperture, all of which are formed in the bottom of said housing;

each of said depressions being located at a corner of the bottom of said housing beneath a respective corner of said plates;

each of said drain channels connecting one of said depressions to said drain hole, said drain channels sloping downward in said housing towards said drain hole.

7. A barbecue grill as claimed in claim 6 wherein each of said plates has two opposite, substantially parallel edges, and a pair of protruding flanges, said flanges protruding from said opposite edges of said plates.

8. A barbecue grill as claimed in claim 7 wherein said flanges extend substantially the entire length of said plates in a direction substantially perpendicular to said plates.

9. A barbecue grill as claimed in claim 4, wherein each of said plates has two opposite, substantially parallel edges, and a pair of protruding flanges, said flanges protruding from said opposite edges of said plates.

10. A barbecue grill as claimed in claim 9 additionally comprising:

a second grate located in said housing above said burner unit and below said grate;

a first spacer means on said grate;

one of said edges of said first plate being supported by said second grate and the other of said edges of said first plate being supported by said first spacer means so that said first plate is in an inclined position sloping downwardly toward a side of said housing; and a second spacer means on the upper surface of said first plate;

one of said edges of said second plate being supported by said second grate and the other of said edges of said second plate being supported on top of said first plate by said second spacer means in an inclined position, said second plate sloping downwardly toward a side of said housing.

11. A barbecue grill as claimed in claim 9, wherein said flanges extend substantially the entire length of said plates in a direction substantially perpendicular to said plates.

* * * * *

UNITED STATES PATENT AND TRADEMARK OFFICE
CERTIFICATE OF CORRECTION

PATENT NO. : 4,683,867
DATED : August 4, 1987
INVENTOR(S) : Theodore J. Beatty

Page 1 of 2

It is certified that error appears in the above-identified patent and that said Letters Patent is hereby corrected as shown below:

Substitute the attached Figures 4, 8, and 9 for the corresponding figures in the patent.

Signed and Sealed this

Twenty-fourth Day of May, 1988

Attest:

DONALD J. QUIGG

Attesting Officer

Commissioner of Patents and Trademarks